United States Patent Office 3,029,147
Patented Apr. 10, 1962

3,029,147
LIQUID SHORTENINGS AND METHOD OF
IMPROVING BAKED GOODS
Sol B. Radlove, 5220 W. Van Buren St., Chicago, Ill.
No Drawing. Filed Nov. 23, 1959, Ser. No. 854,537
12 Claims. (Cl. 99—118)

This invention relates to shortenings for baked goods. More particularly it relates to the preparation of new and useful normally liquid shortenings effective for the production of baked goods such as sweet cake, cokies, rolls, buns, etc., of excellent volume, texture, crumb, shape, aroma, flavor, etc., which comprises normally liquid edible oils containing certain improving agents hereinafter described.

Normally liquid shortenings, as the term is used herein and in the art, comprises oils of vegetable or animal origin, usually the former, representative examples of which are soyabean oil, palm kernel oil, peanut oil, corn oil, olive oil, cottonseed oil, or admixtures thereof. The liquid oils have a variety of potential advantages over the normally solid or plastic shortenings for use in baked dough products. Handling, measuring and storing procedures for the conventional plastic shortenings such as hydrogenated cottonseed oil, other hydrogenated oils and blends thereof are costly, cumbersome and do not permit the utilization of large scale equipment which would otherwise be feasible in the production of baked dough products if an adequately functionally effective normally liquid shortening were available. Further, plastic shortenings require careful processing including careful tempering in order to obtain optimum crystal structure so that they can be used with good results in baking and allied industries. When plastic shortenings are rendered fluid and used in that state in the preparation of baked goods and the like, their effectiveness as shortening agents is markedly decreased.

Despite the decided convenience in ease of handling normally liquid shortenings, their use in the bakery and allied fields has been limited because the results obtained as regards quality and characteristics of the baked goods have been inferior. Except in the case of certain specialized type of cakes, liquid shortenings produced bake dough products with very poor texture, coarse grain and low volume which characteristics have rendered the products commercially unsaleable. Cake batters, for example, made from ordinary edible oils have a relatively high specific gravity, for instance of the order of 1.2 whereas the same cake batters made with typical liquid shortenings of the present invention have specific gravities of the order of 0.9. Despite the incorporation of some of the available shortening agents in edible triglyceride oils, the regular and almost universal practice today is for the use of plastic shortenings.

In an effort to improve shortenings either of the liquid or plastic type, it has become the practice to admix with such shortenings either fatty acid esters of monoglycerides, diglycerides, polyglycerides or mixtures thereof in proportions of the order of 4–8%. Although the addition of such materials to shortenings, particularly plastic shortenings, results in substantial improvements of various of their properties, particularly in relation to the preparation of cakes containing high ratios of sugar to flour, such agents have not been sufficiently effective in the production of normally liquid oil shortening, particularly where they are in the form of stearic acid esters to warrant the expense of incorporating them in the shortening. One reason for the lack of effectiveness of the addition agents is because the esters have had a limited solubility and precipitate out of the normally liquid triglyceride oil shortening at room temperature. In baking, such shortenings produce poor results. When attempting to use such materials as glycerol monostearate or glycerol distearate or mixtures thereof in conjunction with liquid shortenings, it has been proposed to effect uniform incorporation by heating the same to form a solution at a temperature of at least 120° F. or higher before the resulting solution is incorporated with the ingredients of the cake mix or the like. Such procedure is undesirable and cumbersome. In a bakery or, for that matter, in the home, there are obvious disadvantages in such procedures.

In accordance with the present invention, normally liquid shortenings have been evolved which overcomes the disadvantages of normally liquid shortenings which have heretofore been known, the shortening of the present invention making possible the production of a wide variety of baked goods of excellent quality. The improved results of the present invention are achieved through incorporation into conventional oils, such as safflower oil, soyabean oil, cottonseed oil, peanut oil and the like, of particular types of ester reaction products. The improving agents which are added to the normally liquid edible triglyceride oils are essentially soluble therein at room temperature. Speed of dissolution of the ester product in the oil will be accelerated by initially heating the oil up to a temperature of about 40° C. to 50° C.

Oils having ester emulsifiers incorporated therein are quite stable and the resultant shortening can be advantageously used at room temperature in admixture with flour batter ingredients. When the shortenings are subject to long term storage and fluctuating temperature conditions, precipitation stability may be attained by incorporating in the shortening compositions 0.01% to 0.3% of stearic acid monoglyceride.

Stearic acid monoglyceride has limited solubility at room temperature in edible oils. If stearic acid ester is dissolved in edible oil at elevated temperatures, the ester when the oil cools, separates as a fine gelatinous suspension. In the presence of this gelatinous suspension any ester emulsifier precipitating from solution in liquid shortening does so in the form of fine particles which remain suspended for extended periods so that there is little or no change in appearance and effectiveness of a given weight or volume of shortening. At low temperatures, of the order of 5° C. to 0° C., various of the normally liquid shortenings of the present invention tend to congeal but they readily go back into the fluid state when the shortening is brought back to room temperature without heating and without adverse effect on the effectiveness of the improving agents.

The improving agents which are utilized in accordance with the present invention comprise non-toxic esters which are a mixture of diglycerides one of which diglycerides has the general formula

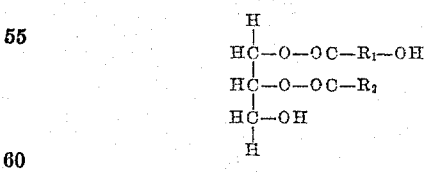

wherein $R_1$ is an aliphatic hydrocarbon group having 2 to 7 carbon atoms and $R_2$ is an aliphatic hydrocarbon having 12 to 20 carbon atoms.

Diglyceride mixtures containing, for example, glyceryl ester with lactyl radical esterified in the 1 position and with a fatty acid radical, such as palmityl radical esterified in either the 2 or 3 position, but not both, may be formed from a substantially anhydrous mixture of epihalohydrin, fatty acid, monohydroxy aliphatic carboxylic acid, in the presence of approximately one molecular equivalent of monovalent basic reacting cation per mole of hydroxy acid and in the presence of or in the absence of a solvent for said acids. Suitable solvents are the inert hydrocarbon compounds such as hexane, benzene, toluene, xylene, etc.

In the preferred embodiment of the present invention, the diglyceride is characterized by the esterification of lactic acid, as the representative monohydroxide saturated aliphatic carboxylic acid, in the 1 or 3 position of epihalohydrin. By varying the type of halohydrin with, however, the halohydrin always being esterified at the terminal position with monohydroxy saturated aliphatic carboxylic acid, and by the selection of particular fatty acids containing from 12 to 20 carbon atoms, improving agents are obtained having useful properties and characteristics which adapt them for use in accordance with the teaching of the present invention.

Illustrative examples of improving agents whose use falls within the scope of the present invention are the diglyceride esters having lactic acid esterified in the 1 position and either palmitic or stearic acid esterified in either the 2 or 3 position, the final diglyceride improving agent being in general a mixture of compounds esterified either in the 1,2 or in the 1,3 positions.

The following examples are illustrative of the production of improving agents and reaction products containing same which are utilized pursuant to the present invention, but are not to be construed as limitative of the scope of the improving agents encompassed by the present invention.

EXAMPLE A 118 grams, i.e., 5% in excess over a 1 molar quantity, of lactic acid (80% concentration) is mixed with sodium hydroxide until the resultant mixture shows a pH of approximately 8. This reaction with lactic acid is carried out at a temperature of approximately 95° C. to 100° C. The reaction mixture is then subjected to vacuum of between 20 and 29 inches of mercury and a temperature of 90 to 100° C. to concentrate the sodium lactate to a gummy syrupy state. To this sodium lactate syrup is added 258 grams (1 mole) of palmitic acid of 90% purity (Armour "Neofat 16") and 100 milliliters of toluene. This reaction mixture is heated and an azeotropic mixture of toluene and water removed. Toluene is separated from the water and continuously returned to the system for distillation until the pot temperature rises from about 120° C. to about 135° C. At this point, 92½ grams (1 mole) of distilled epichlorohydrin is added. The reflux condenser of the reaction vessel is protected to maintain anhydrous conditions. A vigorous reaction takes place when the epichlorohydrin is added at a temperature of about 140° C. and the temperature is maintained at approximately this level for about 1 hour. The resultant mixture is heated for 3 hours at a temperature maintained between 160° C. and 164° C.

After the 4 hour reaction period, toluene is distilled off under vacuum of 20–29 inches of mercury at a temperature of about 110° C. The solvent free reaction product is then water washed with hot water of a temperature of 90° C. to 100° C. This water washing is accomplished by stirring the mixture of water and reaction product slowly and then allowing the separation of two phases, i.e., reaction product as a top phase and water as the bottom phase. Sodium chloride and soluble glycerol derivatives are found in the water phase which is removed.

After drying the diglyceride product on a steam bath under vacuum, 352.5 grams of product were recovered for a yield of 87%. The product has an acid value of 0.85 and a saponification number of 263.5.

This diglyceride mixture has good flavor and upon cooling is a light cream color.

EXAMPLE B 118 grams, i.e., 5% in excess over a 1 molar quantity, of lactic acid (80% concentration) is mixed with sodium hydroxide until the resultant mixture shows a pH of approximately 8. This reaction with the lactic acid is carried out at a temperature of approximately 95° C. to 100° C. The reaction mixture is then subjected to vacuum of between 20 and 29 inches of mercury and a temperature of 90° C. to 100° C. to concentrate the sodium lactate to a gummy syrupy state. To this sodium lactate syrup is added 282 grams (1 mole) of stearic acid of 90% purity (Armour "Neofat 18") and 100 milliliters of toluene. This reaction mixture is heated and an azeotropic mixture of toluene and water removed. Toluene is separated from the water and continuously returned to the system for distillation until the pot temperature rises from about 120° C. to about 135° C. At this point, 92½ grams (1 mole) of distilled epichlorohydrin is added. The reflux condenser of the reaction vessel is protected to maintain anhydrous conditions. A vigorous reaction takes place when the epichlorohydrin is added at a temperature of about 140° C. and the temperature is maintained at approximately this level for about 1 hour. The resultant mixture is heated for 3 hours at a temperature maintained between 160° C. and 164° C.

After the 4 hour reaction period, toluene is distilled off under vacuum of 20–29 inches of mercury at a temperature of about 110° C. The solvent free reaction product is then water washed with hot water of a temperature of 90° C. to 100° C. This water washing is accomplished by stirring the mixture of water and reaction product slowly and then allowing the separation of two phases, i.e., reaction product as a top phase and water as the bottom phase. Sodium chloride and soluble glycerol derivatives are found in the water phase which is removed.

After drying the diglyceride product on a steam bath under vacuum, 382.5 grams of product were recovered for a yield of 89.7%. The product has an acid value of 2.5 and a saponification number of 243.1.

This diglyceride mixture has good flavor and is a light cream color. If the reaction mixture, prepared as described in Example B, is heated at lower temperatures of the order of 135° to 145° C. for an entire period of up to 6 hours, a product is obtained which exhibits slightly different physical characteristics, the resultant product being a translucent material of a waxy amorphous nature.

EXAMPLE C 118 grams (1 mole plus 5% excess) of lactic acid (80% concentration) was reacted with 50% sodium hydroxide solution by adding the alkali with agitation to the lactic acid, the solution being maintained hot on a hot plate until a pH of 8 was attained. The aqueous sodium lactate solution was concentrated to a syrup under vacuum of about 25 inches of mercury at approximately 95° C.

To the sodium lactate syrup was added 282 grams (1 mole) of stearic acid of 90% purity (Armour "Neofat 18") and the mixture stirred while maintaining a temperature of about 120° C. and under a blanket of inert gas until a homogeneous solution resulted. The homogeneous solution was then heated to 148° C. while maintaining a vacuum of 27 inches of mercury.

At this point, 92½ grams (1 mole) of distilled epichlorohydrin was slowly added to the solution. When the mixture was maintained at a temperature of about 140° C., salt formation occurred and the pot temperature quickly rose to 196° C. despite such temperature controlling operations as wrapping the flask in a cold wet towel. Upon standing, the temperature slowly dropped to 160° C. and was maintained at this level for about 3 hours while maintaining a blanket of nitrogen gas in contact with the reaction mixture to exclude atmospheric air. Following cooling of the reacted mixture to about 100° C., the reaction mixture was stirred in contact with boiling water to dissolve the salt and the aqueous phase was discarded. After drying the diglyceride product on a steam bath under vacuum, 386 grams of product were recovered having a yield of approximately 90% of theory. This product had an acid value of 7.7.

EXAMPLE D 118 grams of lactic acid (80% concentration) was reacted with 50% sodium hydroxide solution by adding the alkali with agitation to the lactic acid, the solution being maintained warm on a hot plate until a pH of 8 was attained.

The sodium lactate solution was dried under vacuum at a temperature of about 95°. 100 milliliters of toluene was added and the mixture heated to distil off an azeotropic toluene-water mixture and to produce a sodium lactate concentrate.

To this toluene mixture was added 92½ grams (1 mole) of distilled epichlorohydrin. The mixture was heated to a temperature of approximately 130° C. and then 258 grams (1 mole) of palmitic acid of 90% purity (Armour "Neofat 16") was added.

Upon stirring for 10 minutes, the sodium lactate dissolved and a homogeneous reaction mixture was obtained. When the solution had become homogeneous, the temperature was raised to 140° C. This temperature was maintained for 1 hour, following which the temperature was raised to 165° C. and the mixture held at the latter temperature for 3 hours.

After the 4 hour reaction period, toluene was distilled off under vacuum of 20 to 29 inches of mercury at a temperature of about 110° C. The solvent free reaction product was then washed with hot water having a temperature of 90° C. to 100° C. Water washed diglyceride ester product was dried under vacuum at a temperature of 100° C. to 110° C. and filtered hot. 344 grams of the water washed and dry product were recovered for a yield of approximately 85%. This product had an acid value of 7.6.

Variation in the general length of the monohydroxy aliphatic carboxylic acids and the fatty acids make it possible to vary the emulsification properties rather widely to suit them to different systems in which they are to be used. Thus the fatty acids may have 12 to 20 carbon atoms in the aliphatic chain although for shorting a chain length of 14 to 18 carbon atoms is preferred. The hydroxy acids may have 2 to 7 carbon atoms in the either saturated or unsaturated aliphatic chain but for shortening additives, hydroxy acids of 2 to 4 carbon atoms in the saturated aliphatic chain are preferred. When used in all-purpose shortenings, it has been found that the diglyceride mixture should be formulated so as to have approximately one equivalent mole of myristic, palmitic and stearic acids individually or collectively per mole of glyceride ester and approximately 1 mole of lactic acid per mole of glyceride ester.

Lactic acid is the preferred hydroxy acid for forming the diglyceride esters of this invention. Other monohydroxy carboxylic acids such as glycollic acid, sarcolactic acid, hydracrylic acid, hydroxybutyric acid and malic acids may be used as well.

The proportions of added improving agents in the liquid shortenings are variable. About 2% to about 8% by weight of diglyceride esters, based on the liquid shortenings or oil provides effective amounts of improving agent with a preferred range being about 3% to about 6%. For use by the commercial baker, housewife, etc., the liquid oil shortening will contain a minor proportion of the improving agents. Depending upon the particular improving agent selected and its solubility characteristics in the particular liquid oil, higher concentrations up to about 20% of diglyceride esters may be attained and such concentrates would be subject to dilution with additional oil for utilization in baking or other operations.

Illustrative examples of liquid shortenings made in accordance with the present invention are set out in Table I below.

*Table I*

| Components | Percent Compositions of Shortenings | | | | |
|---|---|---|---|---|---|
| | a | b | c | d | e |
| Cottonseed Oil | 95 | 96 | 95 | | 69 |
| Corn Oil | | | | 95 | 22 |
| Percent Additive of: | | | | | |
| Example A | 4 | | | | 8 |
| Example B | | 3 | | | 8 |
| Example C | | | 4 | | |
| Example D | | | | 4 | |
| Citric Acid Ester | 1 | 1 | 1 | 1 | 1 |

The following example is illustrative of baked goods prepared with typical embodiments of the normal liquid shortenings of the present invention.

EXAMPLE I

Cake batter was prepared utilizing shortening (a) as follows:

Dry ingredients were commingled in the following amounts.

7¾ ozs. of cake flour
10¼ ozs. of granulated sugar
½ oz. of baking powder
¼ oz. of salt To the above dry ingredients was added 100 grams of shortening (a) and 5 ozs. of liquid skim milk, the mixture being beaten for one minute at a medium speed in an electric mixer.

To this flour shortening mixture was added 3 ozs. liquid skim milk, 4 ozs. of egg whites, 5 ml. vanilla extract and the mixture beaten for 3 minutes at a medium speed.

15 ozs. of the batter was deposited in an 8 inch cake pan and the batter baked at 375° F. for 25 minutes.

The following example is illustrative of baked goods prepared from dry ingredients and plastic shortening containing improving agents of the instant invention.

EXAMPLE II

Cake batter was prepared utilizing plastic shortening containing 4% by weight of the reaction product of Example A.

Dry ingredients were commingled in the following amounts.

10¼ ozs. of sugar
7¾ ozs. of flour
½ oz. of baking powder
1 teaspoon of salt
100 grams of shortening
1.1 oz. of non-fat dry milk solids
½ oz. of dried egg whites
8 ozs. of water The shortening was made by melting 95 grams of hydrogenated vegetable shortening with 4 grams of the emulsifier and 1 gram of citric acid ester hereinafter described. The shortening composition was added to the sugar in the bowl and mixed. Dry ingredients were blended into this shortening mixture to form the solids mix. Water was added and the batter was mixed for 4 minutes at a number 6 speed of a kitchen type mixer.

Specific gravity of the batter was 1.01. This batter was white, smooth and thick. 15 ozs. of the batter was deposited in each of 8 inch cake pans and was baked for 25 minutes at approximately 355° F. The resultant layers of cake average 13 ozs. in weight and 1145 ml. in volume. The texture of the cake layers were fairly even and slightly open. The structure was firm, the cake was of good shape and the top had a relatively uniform brown color.

The value of the emulsifiers of Examples A, B and C were compared on the basis of cake batter character utilizing the formula of Example I and indicated amounts of emulsifier incorporated in hydrogenated fat. Results are shown in Table II:

Table II

| Shortening | Specific Gravity of Batter | Volume of 15 ozs. of Batter, milliliter |
|---|---|---|
| 4% of additive of Example A | 0.88 | 1,145 |
| 3% of additive of Example B | 0.93 | 1,100 |
| 4% of additive of Example C | 0.94 | 1,135 |
| 4% of additive of Example A plus 1% of Citric Acid Ester | 0.94 | 1,240 |

The effectiveness of the improving agents of this invention were compared with commercially available products by utilizing the identical household cake formula of Example I for preparation of cakes in which the shortenings were two plastic shortenings, identified as X and Y, a liquid shortening identified as Z and the shortening (a) of Table I. Results are set forth in Table III.

Table III

|  | X | Y | Z | a |
|---|---|---|---|---|
| Specific Gravity of Batter | 0.93 | 1.00 | 1.01 | 0.91 |
| Volume of Cake (ml.) for 15 ozs. of Batter | 1,095 | 1,100 | 995 | 1,195 |
| Overall Rating of a Testing Laboratory Based on all Factors Considered; such as Shape, Texture, Crumb, Aroma, Flavor, etc | 86 | 86 | 71 | 92 |

Where the liquid shortenings of the present invention are to be used for special baking purposes as in "Hi-Ratio" cakes, their utility may be enhanced by the addition thereto of minor proportions of various supplemental agents. In cake baking, esters of diacetyl tartaric acid or citric acid esters of cottonseed oil monoglycerides, are useful. Still others of said agents are the oil soluble esters of alcohols, for example, reaction products wherein cetyl alcohol or stearyl alcohol and citric acid in the ratio of approximately 2 moles of alcohol to 1 mole of acid are reacted under esterification conditions; and cetyl and stearyl esters of itaconic acid.

Supplemental agents, which are illustrative of various others falling into the same general category are effectively utilized in conjunction with the triglyceride oil shortenings of the present invention. The said supplemental agents appear to cooperate with the improving agents heretofore described to give improved results in baking. In general, the supplemental agents include higher molecular fatty acid esters (in which the fatty acid radicals contain from 12 to 22 carbon atoms), i.e., monoglycerides and diglycerides. These products are useful in vegetable oils in amounts of the order of about 2.0% to about 5% based upon the weight of the triglyceride oil shortening as a whole.

The citric acid ester utilized in conjunction with the emulsifiers of this invention, may be prepared as follows:

1½ moles of cottonseed oil monoglycerides, 1½ moles of cetyl alcohol and 1 mole of citric acid are mixed and the mixture heated for 75 minutes at a temperature of 150° C. to 158° C., under nitrogen with a negative pressure sufficient to withdraw water vapor. Acid value of the reaction product is about 44.6.

This reaction mixture is preferred. A useful supplemental agent may be prepared by reacting the cottonseed oil monoglycerides with citric acid in the absence of cetyl alcohol as, for example, by reacting 3 moles of cottonseed oil monoglycerides with 1 mole of citric acid under conditions such as are described for preparation of the preferred mixture.

Preparation of this particular type of supplemental agent is not limited to the reaction of the cottonseed oil monoglycerides. Other monoglycerides such as fatty acid monoglycerides, i.e., stearic acid monoglyceride and the like may be substituted for all or for part of the cottonseed oil monoglycerides.

The mixture used to prepare the preferred supplemental material contains cetyl alcohol. However, other alcohols may be substituted for all or for part of the cetyl alcohol. A particularly useful group of alcohols is the saturated aliphatic monohydric alcohols of 14 to 18 carbon atoms.

Antioxidants or stabilizing agents of various types such as citric acid, propyl gallate, glycol solution of butylated hydroxyanisole, can be added in amounts of the order of 0.025% to 0.075%.

The normally liquid shortening compositions of the present invention are not only easy to handle and, therefore simplify the problems of the large as well as the small commercial baking establishments, but in addition, such shortenings have versatility and can be used as all purpose shortenings not only in the baked goods but also for frying, for use in salad oils and as ingredients of prepared cake mixes, icings, etc. The normally liquid shortenings of the present invention are characterized by good flavor, color, odor, smoke point, stability and the ability to incorporate air and hold it in the cake batter during the baking operation.

While the advantages of the use of the normally liquid shortenings of the present invention are particularly significant in commercial large and small bakeries, they also manifest themselves in household uses. The liquid shortenings disperse very readily in cake ingredients and it is unnecessary to resort to conventional creaming processes of incorporating the sugar with plastic shortenings as is common practice.

I claim:

1. A normally liquid shortening effective for the production of baked goods comprising a normally liquid edible triglyceride oil containing therein from about 2% to about 20% by weight of a diglyceride ester mixture of 1,2 and 1,3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms.

2. A normally liquid shortening effective for the production of baked goods comprising a normally liquid edible trglyceride oil containing therein from about 2% to about 20% by weight of a diglyceride ester mixture of 1,2 and 1,3 diglycerides in which the 1 position is esterified with monohydroxy aliphatic carboxylic acid having an aliphatic hydrocarbon goup of 2 to 7 carbon atoms and one of the two remaining positions is esterified with fatty acid containing from 14 to 18 carbon atoms.

3. A normally liquid shortening effective for the production of baked goods comprising a normally liquid edible triglyceride oil containing therein from about 2% to about 8% by weight of a diglyceride ester mixture of 1,2 and 1,3 diglycerides in which the 1 position is esterified with lactic acid and one of the remaining positions is esterified with stearic acid.

4. A normally liquid shortening effective for the production of baked goods comprising a normally liquid edible triglyceride oil containing therein from about 2% to about 8% by weight of a diglyceride ester mixture of 1,2 and 1,3 diglycerides in which the 1 position is esterified with lactic acid and one of the remaining positions is esterified with palmitic acid.

5. A normally liquid shortening effective for the production of baked goods comprising a normally liquid edible triglyceride oil containing therein from about 2% to about 20% by weight of a diglyceride product of the reaction of substantially equimolar proportions of monohydroxy aliphatic carboxylic acid, fatty acid containing 12 to 20 carbon atoms, and epihalohydrin in the presence of monovalent basic reacting cation in molecular equivalent amounts for reaction with said hydroxy acid.

6. A normally liquid shortening effective for the production of baked goods comprising a normally liquid edible triglyceride oil containing therein from about 2% to about 20% by weight of the reaction product of lactic acid, stearic acid, and epichlorohydrin in the presence of sodium ion in molecular equivalent amounts for reaction with said lactic acid.

7. In a method of preparing shortening-containing baked goods, the improvement which comprises incorporating into the dough batch prior to baking, from about 2% to about 8% based on the weight of the shortening of a diglyceride ester mixture containing material of the general formula

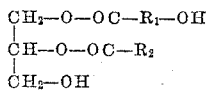

wherein $R_1$ is an aliphatic hydrocarbon group having 2 to 7 carbon atoms and $R_2$ is an aliphatic hydrocarbon group having 12–20 carbon atoms.

8. In a method of preparing shortening-containing baked goods, the improvement which comprises incorporating into the dough batch prior to baking, from about 2% to about 8% based on the weight of the shortening of a diglyceride ester mixture containing material of the general formula

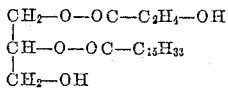

9. In a method of preparing shortening-containing baked goods, the improvement which comprises incorporating into the dough batch prior to baking, from about 2% to about 8% based on the weight of the shortening of a diglyceride ester mixture containing material of the general formula

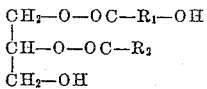

wherein $R_1$ is an aliphatic hydrocarbon group having 2 to 7 carbon atoms and $R_2$ is an aliphatic hydrocarbon group having 12–20 carbon atoms, said diglyceride ester mixture being prepared by reaction of substantially equimolar proportions of monohydroxy aliphatic carboxylic acid, fatty acid and epihalohydrin in the presence of monovalent basic reacting cation in molecular equivalent amount for reaction with said monohydroxy aliphatic monocarboxylic acid.

10. A normally liquid shortening effective for the production of baked goods comprising a normally liquid edible triglyceride oil containing therein from about 2% to about 20% by weight of a diglyceride ester mixture of 1,2 and 1,3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms and containing from about 2.0% to about 5% based upon the weight of the shortening as a whole of fatty acid esters selected from the group consisting of monoglycerides and diglycerides in which the fatty acid radicals contain 12 to 22 carbon atoms.

11. A normally liquid shortening effective for the production of baked goods comprising a normally liquid edible triglyceride oil containing therein from about 2% to about 20% by weight of a diglyceride ester mixture of 1,2 and 1,3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms and containing from about 0.01% to 0.3% based upon the weight of the shortening as a whole of stearic acid monoglyceride as a stabilizer against ester precipitation.

12. A shortening effective for production of baked goods comprising edible glyceride oil having shortening properties and from about 2% to about 20% by weight of a diglyceride ester mixture of 1,2 and 1,3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms.

References Cited in the file of this patent
UNITED STATES PATENTS

| 2,690,971 | Iveson et al. | Oct. 5, 1954 |
| 2,864,705 | Schulman | Dec. 16, 1958 |

UNITED STATES PATENT OFFICE
CERTIFICATE OF CORRECTION

Patent No. 3,029,147                                    April 10, 1962

Sol B. Radlove

It is hereby certified that error appears in the above numbered patent requiring correction and that the said Letters Patent should read as corrected below.

Column 1, line 11, for "cokies" read -- cookies --; line 20, for "admixtures" read -- mixtures --; same column 1, line 61, for "improvements" read -- improvement --; column 5, line 12, for "95°." read -- 95° C. --; line 43, for "shorting" read -- shortening --; column 6, Table I, column 6, line 4 thereof, strike out "8"; same column 6, line 16, for "normal" read -- normally --; column 8, line 45, for "trglyceride" read -- triglyceride --; line 49, for "goup" read -- group --.

Signed and sealed this 4th day of September 1962.

(SEAL)
Attest:

ERNEST W. SWIDER
Attesting Officer

DAVID L. LADD
Commissioner of Patents